United States Patent
Kim et al.

(10) Patent No.: US 11,044,928 B2
(45) Date of Patent: Jun. 29, 2021

(54) METHOD FOR PREPARING RICE HOT PEPPER PASTE AND RICE HOT PEPPER PASTE PREPARED THEREBY

(71) Applicant: CJ Cheiljedang Corporation, Seoul (KR)

(72) Inventors: Hye Jin Kim, Gyeonggi-do (KR); Dong Joo Shin, Gyeonggi-do (KR); Hye Won Shin, Seoul (KR); Eun Seok Jang, Gyeonggi-do (KR); Dae Ik Kang, Gyeonggi-do (KR); Byoung Seok Moon, Gyeonggi-do (KR); Seon Mi Oh, Gyeonggi-do (KR); Sun A Cho, Gyeonggi-do (KR)

(73) Assignee: CJ Cheiljedang Corporation, Seoul (KR)

( * ) Notice: Subject to any disclaimer, the term of this patent is extended or adjusted under 35 U.S.C. 154(b) by 200 days.

(21) Appl. No.: 15/757,083

(22) PCT Filed: Sep. 1, 2016

(86) PCT No.: PCT/KR2016/009809
§ 371 (c)(1),
(2) Date: Mar. 2, 2018

(87) PCT Pub. No.: WO2017/039362
PCT Pub. Date: Mar. 9, 2017

(65) Prior Publication Data
US 2018/0249740 A1    Sep. 6, 2018

(30) Foreign Application Priority Data
Sep. 3, 2015  (KR) .................. 10-2015-0124919

(51) Int. Cl.
*A23L 7/104*    (2016.01)
*A23L 11/50*    (2021.01)
(Continued)

(52) U.S. Cl.
CPC ............... *A23L 7/104* (2016.08); *A23L 11/50* (2021.01); *A23L 11/70* (2021.01); *A23L 27/14* (2016.08); *A23V 2002/00* (2013.01)

(58) Field of Classification Search
CPC . A23L 7/104; A23L 7/14; A23L 11/09; A23L 11/20
See application file for complete search history.

(56) References Cited

U.S. PATENT DOCUMENTS

2006/0067987 A1   3/2006   Koyama et al.
2015/0305376 A1*  10/2015  Oh ........................... C12R 1/69
                                                                    426/52

FOREIGN PATENT DOCUMENTS

CN    103844210 A    6/2014
CN    104508115 A    4/2015
(Continued)

OTHER PUBLICATIONS

Choi et al. KR 100862305 Oct. 13, 2008 Machine Translation (Year: 2008).*
(Continued)

*Primary Examiner* — Felicia C Turner
(74) *Attorney, Agent, or Firm* — Adsero IP (57) ABSTRACT

The present disclosure provides a method for preparing a rice hot pepper paste using an *Aspergillus oryzae* CJ 1354 strain and a *Bacillus amyloliquefaciens* CJ 14-6 strain isolated from traditional meju, and a rice hot pepper paste produced by the preparation method. The method for preparing a rice hot pepper paste includes: soaking rice in water or adding water to rice and steaming the rice; inoculating an *Aspergillus oryzae* CJ 1354 (KCCM 11300P) strain into the steamed rice and conducting incubation to prepare a rice koji; soaking beans in water or adding water to beans and steaming the beans; inoculating a *Bacillus amyloliquefaciens* CJ 14-6 (KCCM 11718P) strain into the steamed beans
(Continued)

and conducting incubation to make a bean koji; adding brine and then at least one selected from the group consisting of steamed rice, bean-processed food stuff, meju, and doenjang to the rice koji and the bean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging.

7 Claims, 4 Drawing Sheets

Specification includes a Sequence Listing.

(51) Int. Cl.
    *A23L 11/70*      (2021.01)
    *A23L 27/14*      (2016.01)

(56) References Cited

FOREIGN PATENT DOCUMENTS

| | | |
|---|---|---|
| CN | 104508119 A | 4/2015 |
| JP | 2006-094747 | 4/2006 |
| JP | 2015-524277 | 8/2015 |
| JP | 2015-524278 | 8/2015 |
| KR | 10-2011-0034932 A | 4/2011 |
| KR | 10-2011-0054601 A | 5/2011 |
| KR | 101163386 B1 | 7/2012 |
| KR | 10-2003-0084180 | 11/2013 |
| KR | 10-2014-0047982 A | 4/2014 |
| KR | 10-2014-0055616 A | 5/2014 |
| KR | 10-2014-0057436 A | 5/2014 |
| KR | 10-2014-0140161 A | 12/2014 |
| RU | 2446708 C1 | 4/2012 |

OTHER PUBLICATIONS

Cho et al. KR 10-2014-0057436. (Year: 2014).*
Shin, Dong Hwa et al., "Science and Food Processing of Red Pepper Paste (*Gochujang*)" Mar. 25, 2011 Public Health Edu., pp. 108-110 (English translation of Chapter 6).
Shin, Hye Won, "Anti-obesity effects of Gochujang prepared with rice koji and fermented soybean meju", Feb. 2016, Doctoral Thesis, Yonsei University, Graduate Program in Biomaterials Science and Engineering, pp. 1-64.
International Search Report mailed in PCT/KR2016/009809 dated Jan. 9, 2017.

* cited by examiner

METHOD FOR PREPARING RICE HOT PEPPER PASTE AND RICE HOT PEPPER PASTE PREPARED THEREBY

RELATED APPLICATIONS

This application is a National Stage Entry of International Application No. PCT/KR2016/009809 filed on Sep. 1, 2016, and claims the benefit of Korean Application No. 10-2015-0124919, filed on Sep. 3, 2015, which is hereby incorporated by reference in its entirety for all purposes as if fully set forth herein The instant application contains a Sequence Listing which has been filed electronically in ASCII format and is hereby incorporated by reference in its entirety. Said ASCII copy, created on Feb. 28, 2018, is named 0117_103_SL.txt and is 2,937 bytes in size.

TECHNICAL FIELD

The present disclosure relates to a method for preparing a rice hot pepper paste and a rice hot pepper paste prepared by the method. More particularly, the present disclosure relates to a method for preparing a rice hot pepper paste and a rice hot pepper paste prepared by the method, which method involves isolating and sorting an *Aspergillus oryzae* CJ 1354 strain as a rice-based koji mold having high carbohydrase and protease activities and a novel *Bacillus amyloliquefaciens* CJ 14-6 strain as a bean-based koji mold having high protease activity and an anti-obesity effect from traditional meju and using the selected strains to prepare a hot pepper paste (gochujang) rich in bioactive substances and promoted in anti-obesity function.

BACKGROUND ART

With the recent rise in living standards, the health functionality of foods is considered valuable. As intensive studies are being conducted all around the world to find naturally occurring substances with functionality and safety, gochujang (Korean hot pepper paste) offers weight-loss or anti-obesity benefits in direct/indirect ways and has come into the spotlight together with doenjang (fermented soybean paste) as a fermented/preserved functional food for extended periods.

Gochujang is one of Korean traditional fermented foods made from fermented soybean (meju) powder, starch resource, hot pepper (red chili) powder, salt, and so forth, and used as one of the main condiments of Korean cooking. It is a condiment that has visual effects with the red color of the chili powder as well as a unique flavor created by a harmony of the savory taste called 'umami' coming from the amino acids as degradation products of the beans, the sweet taste from the sugar as a degradation product of the starch resource, e.g., glutinous rice (sweet rice), nonglutinous rice, barley, etc., and the spicy taste of the chili powder.

Gochujang is basically made from meju (fermented soybean) powder and red chili powder and called 'chapssal (glutinous rice) gochujang', 'mapssal (nonglutinous rice) gochujang', or 'bori (barley) gochujang' according to the type of the starch resource. Further, it is largely classified into Korean-style (traditional) gochujang and factory-made (modified) gochujang according to the preparation method.

The Korean-style (traditional) gochujang is prepared from a mixture of meju (fermented soybean) for gochujang made by mixing beans and grains at a given ratio, a starch resource like rice, yeotgireum (barley malt powder), brine, and red chili powder, through a fermentation and aging process. Different types of bacteria or molds proliferate in the course of the fermentation of boiled soybeans in making meju for gochujang, so during the aging process (6 to 18 months) the enzymes secreted by these microorganisms break down the ingredients into organic acids, nucleic acids, alcohols, etc. that contribute to the taste or flavor of gochujang to form a harmonious savory.

The factory-made gochujang is an aged diastatic gochujang using koji with purely cultured *Aspergillus oryzae* in place of the meju powder for gochujang. In the production of koji, the protein resource is soybean; and the starch resource is rice or wheat flour. In the preparation of the factory-made gochujang, soybean and rice are individually inoculated with *Aspergillus oryzae* and fermented for 3 to 4 days, and the 1:1 mixture of soybean koji and rice koji is used in place of the meju powder. Thus, the enzymatic reaction of *Aspergillus oryzae* and the fermenting action of the yeast enhance the savory and relatively reduce the aging time (15 to 60 days).

As more women enter the workforce outside the home, more people purchase factory-made gochujang. Hence, the production of factory-made gochujang is increasing, and the gochujang export is also on the rise. Hence, many studies have been done to prepare gochujang with accentuated health functionality.

A conventional method to produce gochujang with accentuated health functionality, for example, KR Patent No. 10-2005-0020302 discloses an elm red pepper paste using elm tree leaves containing anticancer, anti-obesity, and anti-insomnia components, and a preparation method for the same. The prior art proposes a method of preparing a red pepper paste as a perfect health food for anticancer, anti-insomnia, or weight-loss diet using a number of produces containing substances beneficial to human body, but there is no telling about whether the red pepper paste actually prepared can make such effects or not.

There is thus a demand for the development of a method for preparing a factory-made gochujang (hot pepper paste) available for large-quantity production with good health functionality.

Prior Technical Documentations (Patent Reference 1) KR 10-2005-0020302 A (laid-open on Mar. 4, 2005)

DISCLOSURE OF INVENTION

Accordingly, the inventors of the present disclosure have found it out that in the preparation of a factory-made hot pepper paste (gochujang) available for large-quantity production with health functionality, it is possible to prepare a hot pepper paste (gochujang) rich in bioactive substances and promoted in anti-obesity function by bringing out the best in the mold-associated traditional gochujang, that is, inoculating an *Aspergillus oryzae* CJ 1354 strain having high amylase and protease activities into rice and a *Bacillus amyloliquefaciens* CJ 14-6 strain having high protease activity and an anti-obesity effect into soybeans, conducting a koji-making process for 3 to 4 days, mixing rice koji and bean koji at a defined mixing ratio, and fermenting the koji mixture, thereby completing the present disclosure.

It is therefore an object of the present disclosure to provide a method for preparing a rice hot pepper paste rich in bioactive substances and promoted in anti-obesity function using *Aspergillus oryzae* CJ 1354 and *Bacillus amyloliquefaciens* CJ 14-6 isolated from the traditional meju.

It is another object of the present disclosure to provide a rice hot pepper paste made by the preparation method for rice hot pepper paste.

To achieve the objects of the present disclosure, there is provided a method for preparing a rice hot pepper paste that includes: soaking rice in water or adding water to rice and steaming the rice; inoculating an *Aspergillus oryzae* CJ 1354 (KCCM 11300P) strain into the steamed rice and conducting incubation to prepare a rice koji; soaking soybeans in water or adding water to soybeans and steaming the soybeans; inoculating a *Bacillus amyloliquefaciens* CJ 14-6 (KCCM 11718P) strain into the steamed soybeans and conducting incubation to make a soybean koji; adding brine and then at least one selected from the group consisting of steamed rice, a bean-processed food stuff, meju, and doenjang to the rice koji and the bean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging.

In addition, the present disclosure provides a rice hot pepper paste prepared by the preparation method for rice hot pepper paste.

Effects of the Invention

The present disclosure involves isolating and sorting a rice-based *Aspergillus oryzae* CJ 1354 strain having high carbohydrase and protease activities and a bean-based *Bacillus amyloliquefaciens* CJ 14-6 strain having high protease activity and an anti-obesity effect from the traditional meju and using them to prepare a rice hot pepper paste rich in bioactive substances and promoted in anti-obesity function.

BRIEF DESCRIPTIONS OF DRAWINGS

The patent or application file contains at least one drawing executed in color. Copies of this patent or patent application publication with color drawing(s) will be provided by the Office upon request and payment of the necessary fee.

BEST MODES FOR CARRYING OUT THE DISCLOSURE

Hereinafter, the present disclosure will be described in detail.

In accordance with one embodiment of the present disclosure, there is provided a method for preparing a rice hot pepper paste that includes: soaking rice in water or adding water to rice and steaming the rice; inoculating an *Aspergillus oryzae* CJ 1354 strain into the steamed rice and conducting incubation to prepare a rice koji; soaking beans in water or adding water to beans and steaming the beans; inoculating a *Bacillus amyloliquefaciens* CJ 14-6 strain into the steamed beans and conducting incubation to make a bean koji; adding brine and then at least one selected from the group consisting of steamed rice, a bean-processed food stuff, meju, and doenjang to the rice koji and the bean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging.

The rice used in the rice-steaming step may be the rice having a whiteness of 28 to 45. The rice with the higher whiteness contains less surface fiber, so the koji molds can penetrate into the grains more easily to realize the higher enzymatic activity and make the texture of the final product, hot pepper paste, but occurs difficulty in transferring process. With the lower whiteness, the rice is easier to transfer but contains more surface fiber, making the entry of the koji molds so hard that the mycelium can be unable to spread out. Therefore, the rice as used herein may have a whiteness of 28 to 45 for large-quantity production in consideration of the penetration of enzymes produced by the koji molds into the grains, the texture of the hot pepper paste, and the easiness in the transfer of steamed rice.

The rice with the defined whiteness range is soaked in water for a predetermined period of time, or a given amount of purified water is added to the rice. The soaking water or the added purified water is drained out and then again for the second time with high-pressure steam (2.0 to 4.0 kgf/cm$^2$). The rice is steamed with saturated steam (1.0 kgf/cm$^2$) at 80 to 110° C. for 15 minutes to 1 hour and then cooled down to 30 to 40° C. so that the moisture content of the steamed rice is controlled in the range of 25 to 35 wt. %. But the rice-cooking method is not specifically limited to this procedure.

In the step of making a rice koji, the *Aspergillus oryzae* CJ 1354 strain is a strain isolated from the traditional meju purchased from Korean traditional food manufacturers and identified. Six strains of *Aspergillus* sp. available as koji molds having high spore production capacity and causing neither toxicity nor allergy are chosen as a first selection out of thirty-two types of molds living as predominant species in the traditional meju and solid-cultured using rice. Then, a strain with high carbohydrase and protease activities from first selected strain is sorted as a second selection. The strain of *Aspergillus* sp. as the final selection is identified through the 16s rDNA sequencing process.

Figure 3:
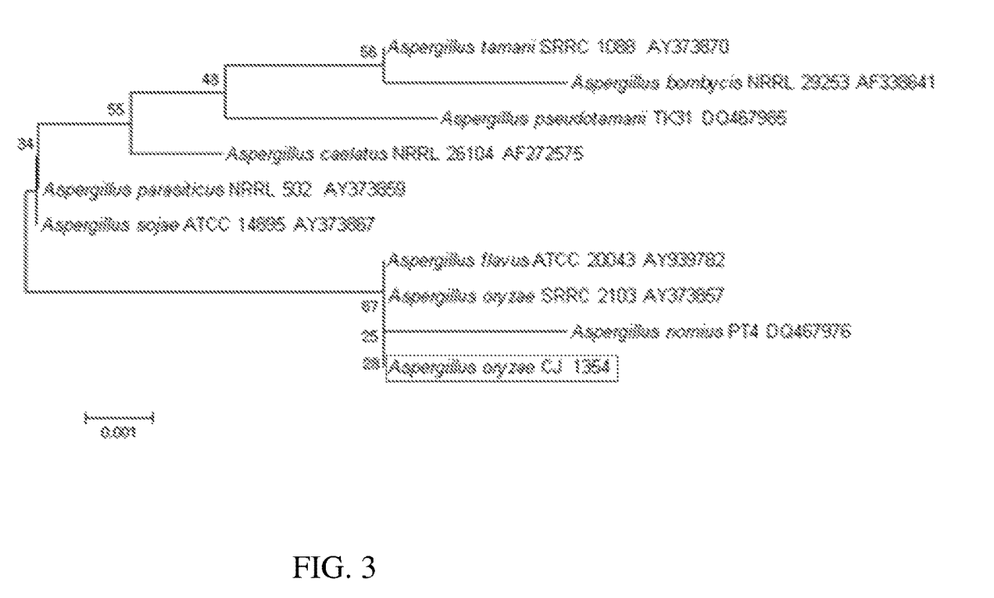
FIG. 3 is the phylogenetic tree based on the 16S rDNA sequencing process, showing the isolated strain of *Aspergillus* sp. was identified as *Aspergillus oryzae*.

According to the phylogenetic tree based on the 16S rDNA sequencing process, the isolated strain of *Aspergillus* sp. was identified as *Aspergillus oryzae* (Sequence No. 1). This strain with high carbohydrase and protease activities was named '*Aspergillus oryzae* CJ 1354' and deposited in the Korean Culture Center of Microorganisms (KCCM) on Sep. 27, 2012 (Accession No. KCCM 11300P) (KR Patent No. 10-2014-0055616).

In the step of making a rice koji, the *Aspergillus oryzae* CJ 1354 is inoculated into the steamed rice and incubated to make a rice koji. For example, the steamed rice may be uniformly mixed with 0.1 to 0.3 wt. % of the *Aspergillus oryzae* CJ 1354 and 0.5 to 1.5 wt. % of grain powder or bean powder as a volume expander with respect to the total weight of the raw material (rice in a raw) and then fermented at 33 to 40° C., more specifically 35 to 40° C., for 3 days to prepare a rice koji.

In the bean-steaming step, selected and washed beans may be soaked in water having a temperature of 10 to 50° C. for 1 to 15 hours, and the soaking water is drained out. The beans may be steamed with saturated steam (1.0 to 2.0 kgf/cm$^2$) at 100 to 150° C. for 1 to 15 minutes, more specifically at 110° C. for 10 minutes. But the bean-cooking method is not specifically limited to this procedure. The steamed beans may be cooled down to about 30 to 50° C., more specifically to about 35° C.

In the step of making a bean koji, the *Bacillus amyloliquefaciens* CJ 14-6 strain is a selected one of different strains isolated from the traditional meju. More specifically, the strains of *Bacillus* sp. having high protease activity on an active medium are sorted as a first selection and solid-cultured on the beans, and a strain with the highest protease activity is considered as a second selection. The strain of *Bacillus* sp. as the final selection is identified through the 16s rDNA sequencing process.

Figure 4:
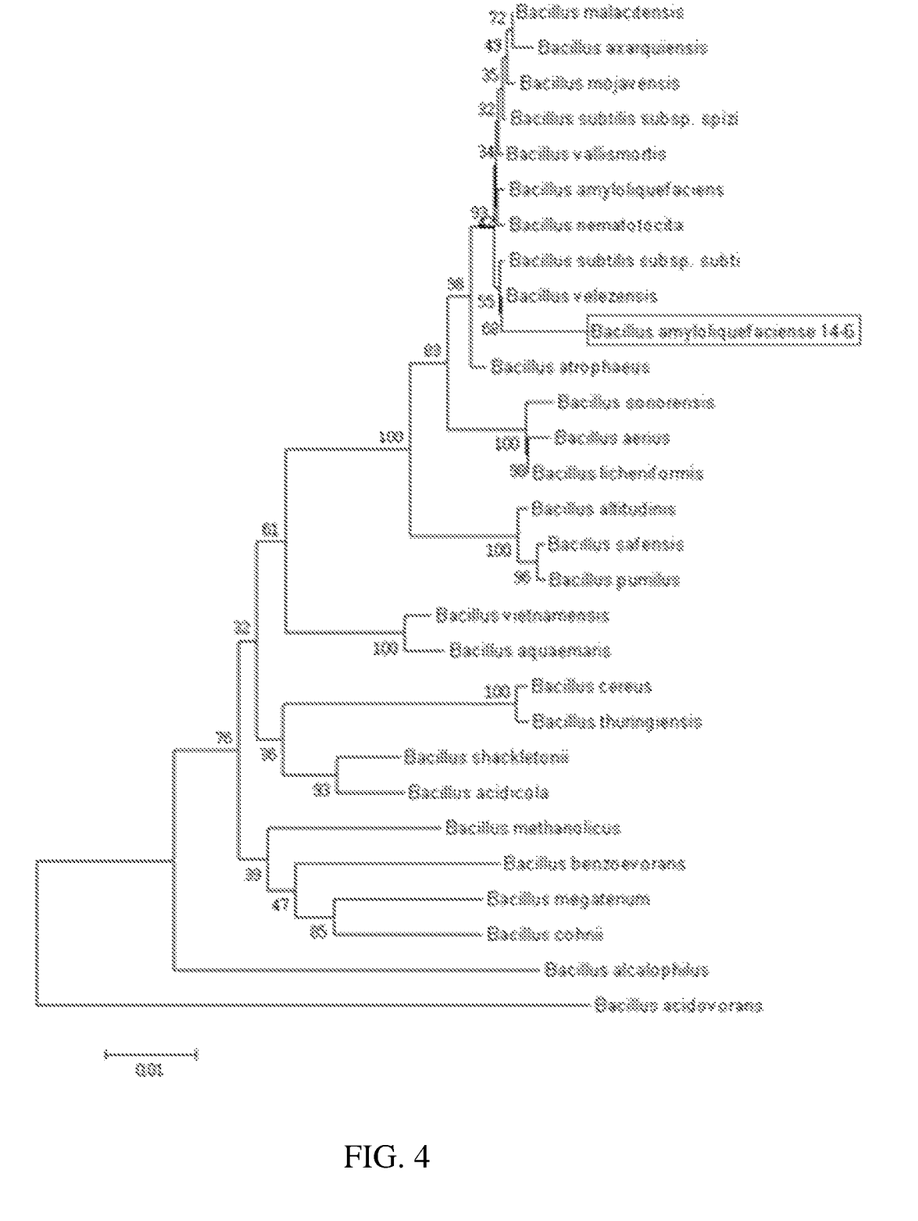
FIG. 4 is the phylogenetic tree based on the 16s rDNA sequencing process, showing the isolated strain of *Bacillus* sp. was identified as *Bacillus amyloliquefaciens*.

According to the phylogenetic tree based on the 16s rDNA sequencing process, the isolated strain of *Bacillus* sp. was identified as *Bacillus amyloliquefaciens* (Sequence No. 2). This strain with high protease activity was named '*Bacillus amyloliquefaciens* CJ 14-6' and deposited in the Korean Culture Center of Microorganisms (KCCM) on Jul. 1, 2015 (Accession No. KCCM 11718P).

In the step of making a bean koji, the *Bacillus amyloliquefaciens* CJ 14-6 is inoculated into the steamed beans and incubated to make a bean koji. More specifically, the steamed beans may be uniformly mixed with 0.1 to 3.0 wt. % of the *Bacillus amyloliquefaciens* CJ 14-6 with respect to the total weight of the raw material (beans in a raw) and then fermented at 30 to 45° C., more specifically 34 to 44° C., for 1 to 3 days to prepare a bean koji.

The *Bacillus amyloliquefaciens* CJ 14-6 strain may be converted into the spore state and cultured for use in a culture solution.

The culture medium for culturing the *Bacillus amyloliquefaciens* CJ 14-6 strain may be a soy sauce medium. The soy sauce medium may be prepared by mixing 1 to 10% of a soy sauce selected from the group consisting of a Korean-style soy sauce, a factory-made soy sauce, and a mixed soy sauce, and 0.1 to 10% of a sugar source selected from the group consisting of glucose, sucrose, galactose, and maltose.

The first aging step includes adding brine and then at least one selected from the group consisting of steamed rice, a bean-processed food stuff, meju, and doenjang to the rice koji and the bean koji to prepare a first mixture, and conducting a first aging.

The brine may be added in an amount of, for example, 15 to 45 wt. % with respect to the total weight of the first mixture.

In the case of adding the steamed rice, the steamed rice may be added in an amount of 0.1 to 15 wt. % with respect to the total weight of the first mixture.

The bean-processed food stuff means a processed stuff using beans as a main ingredient. The meju or doenjang is not specifically limited and may include any known meju or doenjang. Preferably, the bean-processed food stuff may be simply crushed bean.

The at least one selected from the group consisting of steamed rice, a bean-processed food stuff, meju, and doenjang may be added in an amount of, for example, 1 to 20 wt. % with respect to the total weight of the first mixture.

Further, a yeast-cultured solution may be added as an option to the first mixture in order to enhance the taste and flavor of the hot pepper paste. The yeast available is not specifically limited and may include, for example, *Saccharomyces* sp., *Zygosaccharmyces* sp., or *Pichia* sp.

Preferably, the first mixture may have a moisture content of 43 to 53 wt. % with respect to the total weight of the first mixture.

The method may further include a step of chopping the first mixture prior to the aging process.

The chopping procedure means cutting the first mixture into small pieces in a defined size, which is not specifically limited but may be in the range of, preferably over 0 to 20 mm (the inner diameter of amorphous particles of the first mixture), more preferably 1 to 10 mm, most preferably 1 to 5 mm.

By chopping the first mixture before aging, it makes easier for the enzymes to penetrate deep into the core of the grains. This results in producing more various tastes and flavors, shortens the aging time, and enhances the sensory factors (i.e., texture) of the hot pepper paste using the first mixture.

Preferably, the first mixture may be fermented and aged at 25 to 35° C. for 15 to 30 days.

The second aging step includes adding red chili powder and then at least one selected from the group consisting of starch sugar, soy sauce, salt, a spice-processed food stuff, a taste and flavor enhancer, and a grain-processed food stuff to the first mixture to prepare a second mixture, and then conducting sterilization and aging of the second mixture.

More specifically, to the aged first mixture are added red chili powder and at least one selected from the group consisting of starch sugar, soy sauce, salt, a spice-processed food stuff, a taste and flavor enhancer, and a grain-processed food stuff to prepare a second mixture. The second mixture is sterilized at 55 to 125° C. for 0.1 to 60 minutes and aged with an edible alcohol.

The red chili powder may be added in an amount of 1 to 10 wt. % with respect to the total weight of the second mixture. The at least one selected from the group consisting of starch sugar, soy sauce, salt, a spice-processed food stuff, a taste and flavor enhancer, and a grain-processed food stuff may be added in an amount of 0.1 to 60 wt. % with respect to the total weight of the second mixture.

The red chili powder, starch sugar, soy sauce, salt, spice-processed food stuff, taste and flavor enhancer, and grain-processed food stuff are not specifically limited and may include any of them known to those skilled in the art.

The unspecified examples of the spice-processed food stuff may include a dry seasoning spice mixture, a wet seasoning spice mixture, etc.

The unspecified examples of the taste and flavor enhancer may include a yeast extract, a bean or wheat protein extract, etc.

The unspecified examples of the grain-processed food stuff may include nonglutinous rice flour, glutinous rice (sweet rice) flour, barley flour, mixed rice flour, defatted soybean flour, alpha-defatted soybean flour, etc.

In accordance with another embodiment of the present disclosure, there is provided a rice hot pepper paste produced by the preparation method for rice hot pepper paste.

As described above, the present disclosure may provide a rice hot pepper paste (gochujang) rich in bioactive substances and promoted in anti-obesity function according to a preparation method for rich hot pepper paste that involves isolating and sorting a rice-based *Aspergillus oryzae* CJ 1354 strain having high carbohydrase and protease activities and a bean-based *Bacillus amyloliquefaciens* CJ 14-6 strain having high protease activity and an anti-obesity effect from traditional meju and using the selected strains in the preparation of rice hot pepper paste.

Hereinafter, the present disclosure will be described in detail with reference to the following examples, which are given for the illustrations of the present disclosure only and not construed to limit the scope of the present disclosure.

EXAMPLES

Experimental Example 1: Isolation of Strain for Preparation of Rice Koji from Traditional Meju and Identification (1) Isolation and Identification of Strain The strains used as a fermentation starter in the present disclosure were isolated and sorted from a traditional meju collection available from the traditional food manufacturers in the Gyeonggi-do, Gangwon-do, Chungbuk, and Chunnam Provinces.

The traditional meju was diluted in sterilized water, spread on a potato dextrose agar (Difco) used as a mold-isolation medium containing 20 μg/ml of chloramphenicol, and cultured at 37° C. Thirty-two molds living as dominant species in the traditional meju were isolated through the pure culture isolation method and identified. The results of identification and the spore production capacity of the individual strains are presented in Table 1.

TABLE 1

Identification Results of Strains Isolated from Traditional Meju and Spore Production Capacity of Individual Strains

| Strains | Identification Results | Spore Production Capacity | Comments |
|---|---|---|---|
| CJ 1333 | *Aspergillus oryzae* | ** | |
| CJ 1334 | *Aspergillus oryzae* | *** | |
| CJ 1335 | *Aspergillus oryzae* | *** | |
| CJ 1336 | *Aspergillus oryzae* | *** | |
| CJ 1337 | *Aspergillus flavus* | * | Toxigenic |
| CJ 1338 | *Aspergillus niger* | *** | |
| CJ 1339 | *Aspergillus flavus* | * | Toxigenic |
| CJ 1340 | *Aspergillus tubingensis* | *** | *Aspergillus niger* |
| CJ 1341 | — | X | Producing no spore |
| CJ 1342 | *Aspergillus sydowii* | ** | |
| CJ 1343 | *Penicillium polonicum* | * | |
| CJ 1344 | *Mucor racemosus* | ** | |
| CJ 1345 | *Penicillium polonicum* | * | Allergenic |
| CJ 1346 | *Mucor racemosus* | *** | |
| CJ 1347 | *Penicillium polonicum* | * | |
| CJ 1348 | *Emericella nidulans* | * | Allergenic |
| CJ 1349 | *Talaromyces spectabilis* | ** | |
| CJ 1350 | *Emericella rugulosa* | ** | Allergenic |
| CJ 1351 | *Mucor racemosus* | *** | |
| CJ 1352 | *Emericella dentata* | * | Allergenic |
| CJ 1353 | *Mycocladus corymbiferus* | *** | |
| CJ 1354 | *Aspergillus oryzae* | *** | |
| CJ 1355 | *Mycocladus corymbiferus* | *** | |
| CJ 1356 | *Aspergillus flavus* | *** | Toxigenic |
| CJ 1357 | *Absidia corymbifera* | * | |
| CJ 1358 | *Aspergillus oryzae* | ** | |
| CJ 1359 | *Aspergillus oryzae* | ** | |
| CJ 1360 | *Aspergillus vadensis* | ** | |
| CJ 1361 | — | * | |
| CJ 1362 | — | * | |

TABLE 1-continued

Identification Results of Strains Isolated from Traditional Meju and Spore Production Capacity of Individual Strains

| Strains | Identification Results | Spore Production Capacity | Comments |
|---|---|---|---|
| CJ KY | *Aspergillus oryzae* | *** | |
| CJ KG | *Aspergillus oryzae* | *** | |

(2) First Sorting

The first selection sorted from the thirty-two molds isolated from the traditional meju was six strains collectively considered available as a koji mold with high spore production capacity.

The six strains in the first selection were CJ 1334, CJ 1335, CJ 1336, CJ 1354, CJ KY, and CJ KG.

(3) Second Sorting

The six strains sorted as the first section were used to prepare a rice koji and measured in regards to the amylase and protease activities. The measurement results are presented in Table 2. Through a comparison in the amylase and protease activities, the strain with the highest amylase and protease activities was sorted as a second selection.

For the preparation of a rice koji, 1 kg of rice was soaked in purified water for 30 minutes, steamed in a high-pressure steam sterilizer (Autoclave) at 110° C. for 15 minutes, and then cooled down to 35° C. Each of the strains sorted as the first selection was added to the cool steamed rice in an amount of 0.2 wt. % with respect to the total weight of the raw material and incubated at 35° C. for 3 days. The strains thus cultured were used to make the individual rice koji.

To measure the amylase activity, each rice koji was extracted with a 2% aqueous solution of NaCl at 30° C. for one hour and filtered out. The filtrate was diluted to 1/100 its concentration for use as a coenzyme solution. An enzyme reaction solution was prepared by adding 1 ml of the coenzyme solution, 2 ml of 1% starch sugar as a substrate, and 2 ml of a phosphate buffer (pH 5.2). In 30 minutes of the enzyme reaction at 40° C., 10 ml of 0.1N $CH_3COOH$ was added to terminate the reaction. 10 ml of 0.005% $KI+I_2$ solution was added to stain the enzyme reaction solution at room temperature, and the absorbance at 660 nm was determined with a UV spectrophotometer.

To measure the protease activity, each rice koji was extracted with distilled water at 30° C. for one hour and filtered out. The filtrate was used as a coenzyme solution. An enzyme reaction solution was prepared by adding 0.5 ml of the coenzyme solution, 1.5 ml of 2% milk casein as a substrate, and 1 ml of a McIlivine buffer (pH 6.0). In one hour of the enzyme reaction at 38° C., 3 ml of 0.4M TCA solution was added to terminate the reaction. A filtration was carried out to obtain the filtrate, which was then sufficiently mixed with 5 ml of 0.4M $Na_2CO_3$ and 1 ml of phenol reagent. The resultant solution was stained at 38° C. for 30 minutes, and the absorbance at 660 nm was determined with a spectrophotometer. In the expression of the enzyme activity, the amount of an enzyme producing tyrosine corresponding to 1 μg per minute was defined as one unit. Tyrosine was used as a reference substance to form a calibration curve.

TABLE 2

Comparison of Protease Activity for Rice Koji Using Strains of First Selection

| Strains of First Selection | Amylase Activity (U/g) | Protease Activity (U/g) |
|---|---|---|
| CJ 1334 | 511 | 68 |
| CJ 1335 | 511 | 66 |
| CJ 1336 | 478 | 62 |
| CJ 1354 | 632 | 69 |
| CJ KY | 514 | 69 |
| CJ KG | 511 | 64 |

From the results of Table 2, the CJ 1354 strain with the highest amylase and protease activities was sorted as a second selection.

Experimental Example 2: Isolation of Strain for Preparation of Bean Koji from Traditional Meju and Identification (1) Isolation and Identification of Strain The strains used as a fermentation starter in the present disclosure were isolated and sorted from the traditional meju collection available from the traditional food manufacturers in the Gyeonggi-do, Gangwon-do, Chungbuk, and Chunnam Provinces.

The traditional meju was diluted in sterilized water, spread on a Nutrient agar (Difco), and cultured at 37° C. Five molds living as dominant species in the traditional meju were isolated through the pure culture isolation method and identified. The isolated strains were named CJ 3-27, CJ 4-4, CJ 5-10, CJ 14-6, and CJ 16-57.

The isolated strains were cultured by shaking at 200 rpm in a nutrient broth (Difco) at 37° C. for 24 hours, and the protease activity was measured for comparison. The identification results and the measurement results of the protease activity are presented in Table 3.

TABLE 3

Identification Results of Strains Isolated from Traditional Meju and Protease Activity

| Strains | Protease Activity (U/g) | Identification Results |
|---|---|---|
| CJ 3-27 | 62.58 ± 0.17 | Bacillus amyloliquefaciens |
| CJ 4-4 | 91.44 ± 6.97 | Bacillus licheniformis |
| CJ 5-10 | 61.72 ± 4.13 | Bacillus subtilis subsp. Subtilis |
| CJ 14-6 | 140.73 ± 4.62 | Bacillus amyloliquefaciens |
| CJ 16-57 | 222.42 ± 0.63 | Bacillus licheniformis |

(2) First Sorting

The first selection was CJ 3-27, CJ 4-4, CJ 14-6, and CJ 16-57 other than CJ 5-10, which had the lowest protease activity among the isolated strains.

(3) Second Sorting

The four strains sorted as the first section were used to prepare a bean koji and measured in regards to the protease activity. The measurement results are presented in Table 4. Through a comparison in the protease activity, the strain with the highest protease activity was sorted as a second selection.

For the preparation of a bean koji, 1 kg of beans were soaked in purified water for 12 hours, steamed in a high-pressure steam sterilizer (Autoclave) at 110° C. for 10 minutes, and then cooled down to 35° C. Each of the strains sorted as the first selection was added to the cool steamed beans in an amount of 2.0 wt. % with respect to the total weight of the raw material and incubated at 37° C. for 3 days. The strains thus cultured were used to make the individual bean koji.

To measure the protease activity, the procedures were performed in the same manner as described in Experimental Example 1, excepting that the bean koji was used.

TABLE 4

Comparison of Protease Activity for Bean Koji Using Strains of First Selection

| Strains of First Selection | Protease Activity (U/g) |
|---|---|
| CJ 3-27 | 258 |
| CJ 4-4 | 118 |
| CJ 14-6 | 225 |
| CJ 16-57 | 155 |

From the results of Table 4, the second selection was Bacillus amyloliquefaciens CJ 14-6, which had a high protease activity and a strong anti-obesity effect (not shown) 2 to 9 times as high as the same concentration in the in-vitro 3T3-L1 adipocyte-degradation testing.

Example 1: Preparation of Rice Koji Using Aspergillus oryzae CJ 1354

The Aspergillus oryzae CJ 1354 sorted as the final selection in the Experimental Example 1 was used to make a rice koji as follows.

Every one hour, saturated steam (1.0 kgf/cm$^2$) was forced into the steamed rice prepared in the Experimental Example 1 and cooled down while transferred to a koji-making chamber, so that moisture was provided for the outer surface and the inside of the dried rice. The moisturized rice was inoculated with 0.2 wt. % of the Aspergillus oryzae CJ 1354 strain sorted in the Example 1 as a koji mold and then subjected to a koji-making fermentation process at 38° C. for 3 days.

Comparative Example 1: Preparation of Rice Koji Using Regular Aspergillus oryzae As a control group to the Example 1, Aspergillus oryzae commercially available from Chungmoo Fermentation Co. was used to prepare a rice koji as follows.

Every one hour, saturated steam (1.0 kgf/cm$^2$) was forced into the steamed rice prepared in the Experimental Example 1 and cooled down while transferred to a koji-making chamber, so that moisture was provided for the outer surface and the inside of the dried rice. The moisturized rice was inoculated with 0.2 wt. % of the regular Aspergillus oryzae strain used as a koji mold and then subjected to a koji-making fermentation process at 38° C. for 3 days.

Each rice koji prepared in Example 1 or Comparative Example 1 was measured in regards to the amylase and protease activities. The measurement results are presented in Table 5. The amylase and protease activities were determined in the same manner as described in the Experimental Example 1-(3).

TABLE 5

Enzyme Activities of Rice Koji Using *Aspergillus oryzae* CJ
1354 or Regular *Aspergillus Oryzae*

| Div. | Amylase Activity (U/g) | Protease Activity (U/g) |
| --- | --- | --- |
| Example 1 | 323.2 | 53.7 |
| Comparative Example 1 | 276.0 | 48.0 |

From the results of Table 5, the rice koji using the *Aspergillus oryzae* CJ 1354 strain had higher values of the amylase and protease activities than the rice koji using the regular *Aspergillus oryzae* by 17.1% and 11.8%, respectively.

In addition, each rice koji was measured in regards to the total polyphenol content and the total flavonoids content. The measurement results are presented in the following Tables 6 and 7.

In order to extract samples for the analysis of the total polyphenol content and the total flavonoids content, 100 mg of each dried specimen (the completed hot pepper paste, the semi-completed hot pepper paste, or the raw material) was extracted with 1 mL of a mixed solvent (80% MeOH) using a mixer mill (Retsch MM400, Germany) at 30 frequency for 10 minutes and centrifugally separated (13000 rpm, 4° C., 5 min.) with a centrifugal separator. After a filtration of the supernatant, the extract was dried out with a speed vacuum.

The analysis method for the total polyphenol content was given as follows.

100 μL of a 0.2N Folin-Ciocalteu's phenol reagent was added to 20 μL of the 80% MeOH extract specimen, which was then placed in the dark. After the completion of a 6-minute reaction, 80 μL of 7.5% sodium carbonate solution was added, and the absorbance at 750 nm was measured with a microplate reader (Thermo Electron, Spectronic Genesys 6, Madison, Wis., USA). The total polyphenol content was determined from the gallic acid standard curve (mM/g). The concentration range of the standard solution was 15 to 500 ppm. Each experiment was conducted repeatedly three times.

The analysis method for the total flavonoids content was given as follows.

180 μL of 90% diethylene glycol and 20 μL of 1N NaOH were added to 20 μL of the 80% MeOH extract specimen, which was then placed in the dark. After the completion of a one-hour reaction, the absorbance at 405 nm was measured with a microplate reader (Thermo Electron, Spectronic Genesys 6, Madison, Wis., USA). The total flavonoids content was determined from the naringin standard curve (mM/g). The concentration range of the standard solution was 6 to 200 ppm. Each experiment was conducted repeatedly three times.

After a multivariate statistic analysis, the principal metabolome was identified through the mass spectra, retention time, etc. If there was a standard (reference) substance, an identification process was carried out through the standard (reference) substance; if not, a preliminary identification was performed with reference to the NIST05 MS Library (NIST, 2005) or references, combined chemical dictionary version 7.2 (Chapman & Hall/CRC), or in-house library. In the UPLC-Q-TOF-MS analysis, the chemical formula of the metabolome was found by way of the accurate weight and the metal (elemental) compositions using the MassLynx software (Waters Corp.) and the metabolome was identified through the $MS^n$ fragmentation pattern and the UV spectrum.

TABLE 6

Total Polyphenol Content (%) of Rice Koji Using
*Aspergillus oryzae* CJ 1354 or Regular *Aspergillus Oryzae*

| Raw material | Initial stage-steamed rice | Example 1 - after koji-making | Comparative Example 1 - after koji-making |
| --- | --- | --- | --- |
| GAE* | 17.523 | 28.600 | 26.685 |
| | 23.523 | 34.292 | 27.096 |
| | 24.138 | 37.215 | 26.274 |
| Average | 21.728 | 33.369 | 26.685 |
| Standard deviation | 3.655 | 4.381 | 0.411 |

*GAE: Gallic acid equivalent

TABLE 7

Total flavonoids Content (%) of Rice Koji Using
*Aspergillus oryzae* CJ 1354 or Regular *Aspergillus Oryzae*

| Raw material | Initial stage-steamed rice | Example 1 - after koji-making | Comparative Example 1 - after koji-making |
| --- | --- | --- | --- |
| NE* | 2.185 | 6.364 | 6.364 |
| | 1.444 | 6.364 | 5.000 |
| | 0.704 | 5.909 | 5.000 |
| Average | 1.444 | 6.212 | 5.455 |
| Standard deviation | 0.741 | 0.262 | 0.787 |

*NE: Naringenin equivalent

As can be seen from the results of Tables 6 and 7, the rice koji using the *Aspergillus oryzae* CJ 1354 strain had higher values of the total polyphenol content and the total flavonoids content than the rice koji using the regular *Aspergillus oryzae* by 25.0% and 13.9%, respectively, showing the tendency towards the increase in the bioactive substances relating to the anti-obesity effect.

Example 2: Preparation of Bean Koji Using *Bacillus amyloliquefaciens* CJ 14-6

The steamed beans were transferred to a koji-making chamber, inoculated with 2.0 wt. % of the *Bacillus amyloliquefaciens* CJ 14-6 strain used as a koji mold, and then subjected to a koji-making fermentation process at 37° C. for 3 days.

Comparative Example 2: Preparation of Bean Koji Using Regular *Aspergillus oryzae*

The steamed beans were transferred to a koji-making chamber, inoculated with 0.2 wt. % of the regular *Aspergillus oryzae* available from Chungmoo Fermentation Co. as a koji mold, and then subjected to a koji-making fermentation process at 38° C. for 3 days.

Each bean koji prepared in Example 2 or Comparative Example 2 was measured in regards to the amylase and protease activities. The measurement results are presented in Table 8. The amylase and protease activities were determined in the same manner as described in the Experimental Example 1-(3).

TABLE 8

Enzyme Activities of Bean Koji Using *Bacillus amyloliquefaciens* CJ 14-6 or Regular *Aspergillus Oryzae*

| Div. | Amylase Activity (U/g) | Protease Activity (U/g) |
|---|---|---|
| Example 2 | 142.0 | 225.0 |
| Comparative Example 2 | 202.0 | 102.0 |

Referring to Table 8, the bean koji using the *Bacillus amyloliquefaciens* CJ 14-6 strain had a higher value of the protease activity than the bean koji using the regular *Aspergillus oryzae* by 120.6%. In addition, each bean koji was measured in regards to the total polyphenol content and the total flavonoids content. The measurement results are presented in the following Tables 9 and 10.

TABLE 9

Total Polyphenol Content (%) of Bean Koji Using *Bacillus amyloliquefaciens* CJ 14-6 or Regular *Aspergillus oryzae*

| Raw material | Initial stage-steamed beans | Example 2 - after koji-making | Comparative Example 2 - after koji-making |
|---|---|---|---|
| GAE* | 86.908 | 169.677 | 91.931 |
| | 96.600 | 189.985 | 98.914 |
| | 94.446 | 192.908 | 118.052 |
| Average | 92.651 | 184.190 | 102.966 |
| Standard deviation | 5.089 | 12.653 | 13.523 |

*GAE: Gallic acid equivalent

TABLE 10

Total flavonoids Content (%) of Bean Koji Using *Bacillus amyloliquefaciens* CJ 14-6 or Regular *Aspergillus oryzae*

| Raw material | Initial stage-steamed beans | Example 2 - after koji-making | Comparative Example 2 - after koji-making |
|---|---|---|---|
| NE* | 58.182 | 111.818 | 60.000 |
| | 55.909 | 122.273 | 70.000 |
| | 75.455 | 128.182 | 72.727 |
| Average | 63.182 | 120.758 | 67.576 |
| Standard deviation | 10.689 | 8.286 | 6.701 |

*NE: Naringenin equivalent

As can be seen from the results of Tables 9 and 10, the bean koji using the *Bacillus amyloliquefaciens* CJ 14-6 strain had higher values of the total polyphenol content and the total flavonoids content than the bean koji using the regular *Aspergillus oryzae* by 78.9% and 78.7%, respectively, showing the tendency towards the increase in the bioactive substances relating to the anti-obesity effect.

Example 3: Preparation and Aging (First Aging Step) of First Mixture Using *Aspergillus oryzae* CJ 1354 and *Bacillus amyloliquefaciens* CJ 14-6

A first mixture having the final moisture content of 45 wt. % was prepared by adding, with respect to the total weight of the first mixture, 35 to 40 wt. % of brine (30° C.), 5 to 12 wt. % of simply ground bean commercially available, meju commercially available (modified or traditionally fermented meju using beans alone or in combination with a starch resource) and doenjang commercially available (modified or traditionally fermented doenjang using beans alone or in combination with a starch resource), and 3 to 12 wt. % of steamed rice to the rice koji of Example 1 and the bean koji of Example 2. The first mixture was then aged at 30° C. for 25 to 30 days.

Comparative Example 3: Preparation and Aging of First Mixture Using Regular *Aspergillus oryzae*

The procedures were performed in the same manner as described in Example 3, excepting that the rice koji of Comparative Example 1 and the bean koji of Comparative Example 2 were used to prepare a first mixture having the final moisture content of 45 wt. %. The first mixture was then aged at 30° C. for 25 to 30 days.

The first mixtures prepared in Example 3 and Comparative Example 3 were individually measured in regards to the total polyphenol content and the total flavonoids content. The measurement results are presented in the following Tables 11 and 12.

TABLE 11

Total Polyphenol Content (%) of First Mixture of Rice Koji Using *Aspergillus Oryzae* CJ 1354 and Bean Koji Using *Bacillus Amyloliquefaciens* CJ 14-6 and First Mixture of Rice Koji and Bean Koji Using Regular *Aspergillus Oryzae*

| Semi-completed product | First mixture of Example 3 | | First mixture of Comparative Example 3 | |
|---|---|---|---|---|
| | Initial stage | After aging | Initial stage | After aging |
| GAE* | 24.522 | 57.657 | 12.438 | 24.493 |
| | 28.552 | 61.09 | 12.164 | 24.904 |
| | 29.299 | 63.925 | 11.89 | 24.904 |
| Average | 27.458 | 60.891 | 12.164 | 24.767 |
| Standard deviation | 2.569 | 3.139 | 0.274 | 0.237 |

*GAE: Gallic acid equivalent

TABLE 12

Total flavonoids Content (%) of First Mixture of Rice Koji Using *Aspergillus Oryzae* CJ 1354 and Bean Koji Using *Bacillus Amyloliquefaciens* CJ 14-6 and First Mixture of Rice Koji and Bean Koji Using Regular *Aspergillus Oryzae*

| Semi-completed product | First mixture of Example 3 | | First mixture of Comparative Example 3 | |
|---|---|---|---|---|
| | Initial stage | After aging | Initial stage | After aging |
| NE* | 5.208 | 3.333 | 1.278 | 1.278 |
| | 5.000 | 3.75 | 1.463 | 1.093 |
| | 4.792 | 3.542 | 1.278 | 0.722 |
| Average | 5.000 | 3.542 | 1.340 | 1.031 |
| Standard deviation | 0.208 | 0.208 | 0.107 | 0.283 |

*NE: Naringenin equivalent

NE: Naringenin equivalent

As can be seen from the results of Tables 11 and 12, the first mixture of the rice koji using the *Aspergillus oryzae* CJ 1354 strain and the bean koji using the *Bacillus amyloliquefaciens* CJ 14-6 strain had higher values of the total polyphenol content and the total flavonoids content than the first mixture of the rice koji and bean koji using the regular *Aspergillus oryzae* strain by 145.9% and 243.5%, respectively, showing the tendency towards the increase in the bioactive substances relating to the anti-obesity effect.

Example 4: Preparation and Aging (Second Aging Step) of Second Mixture Using *Aspergillus oryzae* CJ 1354 and *Bacillus amyloliquefaciens* CJ 14-6

A second mixture was prepared by adding, with respect to the total weight of the second mixture, 1 to 6 wt. % of red chili powder commercially available, 15 to 25 wt. % of a wet seasoning spice mixture, 25 to 30 wt. % of a starch sugar, and 0.1 to 1 wt. % of salt to the first mixture of Example 3 after the completion of fermentation and aging for 15 to 30 days in the first aging step. It was sterilized at 70° C. for 15 minutes and then aged in the presence of 1 to 2 wt. % of an edible alcohol to prepare a rice hot pepper paste.

Comparative Example 4: Preparation and Aging of Second Mixture Using Regular *Aspergillus oryzae*

The procedures were performed in the same manner as described in Example 4, excepting that the first mixture prepared in Comparative Example 3 after the completion of fermentation and aging for 25 to 30 days in the first aging step was used to prepare a rice hot pepper paste.

The second mixtures, that is, the rice hot pepper pastes, prepared in Example 4 and Comparative Example 4 were individually measured in regards to the total polyphenol content and the total flavonoids content. The measurement results are presented in the following Tables 13 and 14.

TABLE 13

Total Polyphenol Content (%) of Rice Hot Pepper Paste Prepared with Rice Koji Using *Aspergillus Oryzae* CJ 1354 and Bean Koji Using *Bacillus Amyloliquefaciens* CJ 14-6 and Rice Hot Pepper Paste Prepared with Rice Koji and Bean Koji Using Regular *Aspergillus Oryzae*

|  | Rice hot pepper paste of Example 4 | Rice hot pepper paste of Comparative Example 4 |
| --- | --- | --- |
| GAE* | 26.233 | 20.658 |
|  | 26.408 | 21.616 |
|  | 26.358 | 21.753 |
| Average | 26.333 | 21.342 |
| Standard deviation | 0.090 | 0.597 |

*GAE: Gallic acid equivalent

TABLE 14

Total flavonoids Content (%) of Rice Hot Pepper Paste Prepared with Rice Koji Using *Aspergillus Oryzae* CJ 1354 and Bean Koji Using *Bacillus Amyloliquefaciens* CJ 14-6 and Rice Hot Pepper Paste Prepared with Rice Koji and Bean Koji Using Regular *Aspergillus Oryzae*

|  | Rice hot pepper paste of Example 4 | Rice hot pepper paste of Comparative Example 4 |
| --- | --- | --- |
| NE* | 10.825 | 7.000 |
|  | 11.075 | 2.185 |
|  | 12.200 | 2.185 |
| Average | 11.367 | 3.790 |
| Standard deviation | 0.732 | 2.780 |

*NE: Naringenin equivalent

As can be seen from the results of Tables 13 and 14, the rice hot pepper paste prepared with the rice koji using the *Aspergillus oryzae* CJ 1354 strain and the bean koji using the *Bacillus amyloliquefaciens* CJ 14-6 strain had higher values of the total polyphenol content and the total flavonoids content than the rice hot pepper paste prepared with the rice koji and bean koji using the regular *Aspergillus oryzae* strain by 23.4% and 199.9%, respectively, showing the tendency towards the increase in the bioactive substances relating to the anti-obesity effect.

Figure 1:
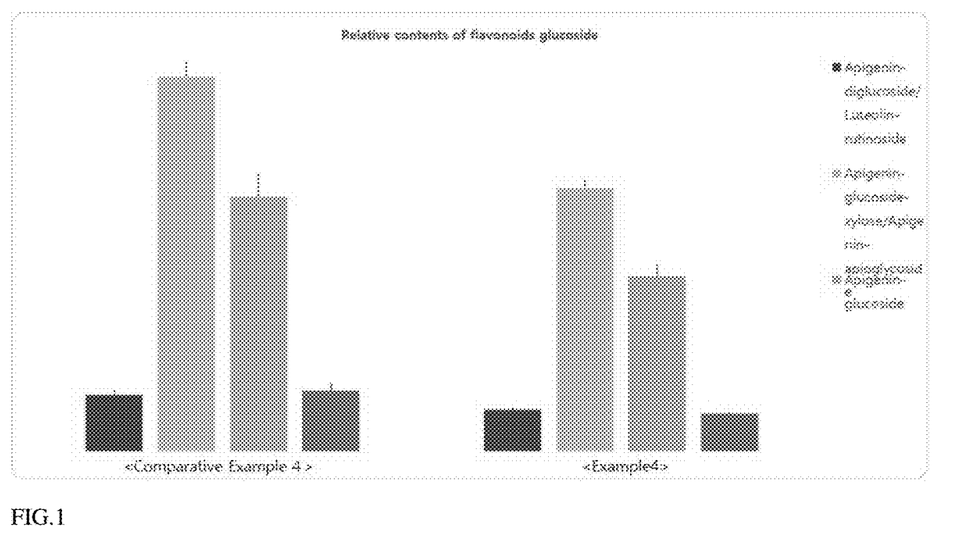
FIG. 1 shows the flavonoids-glucoside content (%) of a rice hot pepper paste (HF-B) prepared with a rice koji using an *Aspergillus oryzae* CJ 1354 strain and a bean koji using a *Bacillus amyloliquefaciens* CJ 14-6 strain and a rice hot pepper paste (HF-A) with a rice koji and a bean koji using a regular *Aspergillus oryzae* strain.
Figure 2:
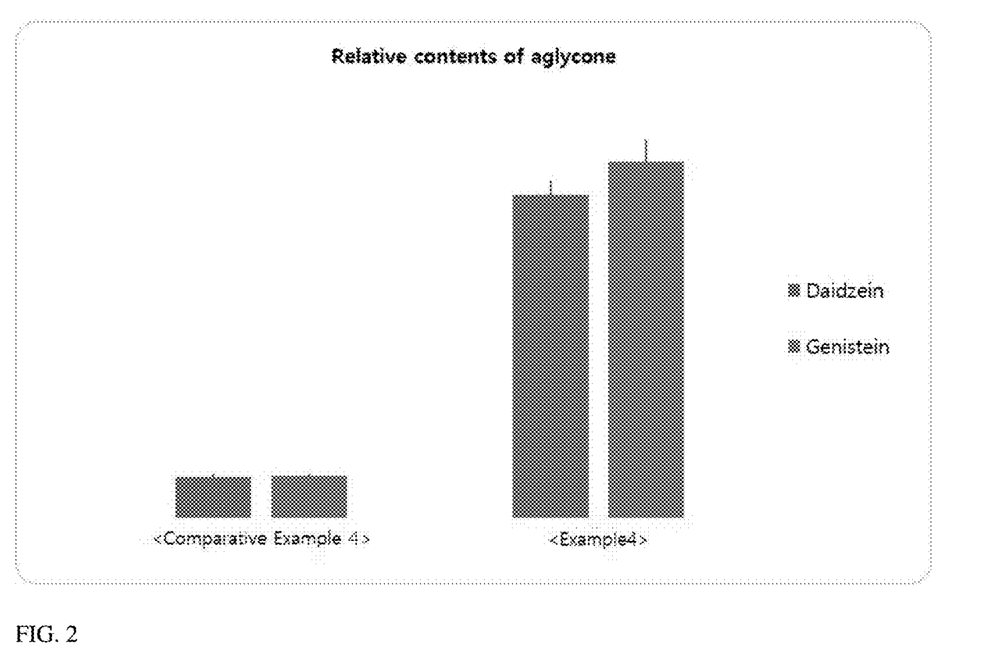
FIG. 2 shows the flavonoids-aglycone content (%) of a rice hot pepper paste (HF-B) prepared with a rice koji using an *Aspergillus oryzae* CJ 1354 strain and a bean koji using a *Bacillus amyloliquefaciens* CJ 14-6 strain and a rice hot pepper paste (HF-A) with a rice koji and a bean koji using a regular *Aspergillus oryzae* strain.

As for the total polyphenol and flavonoids contents, the rice hot pepper paste prepared with the rice koji using the *Aspergillus oryzae* CJ 1354 strain and the bean koji using the *Bacillus amyloliquefaciens* CJ 14-6 strain had a higher content of flavonoids in the form of highly active aglycone, that is, genistein and daidzein, than the rice hot pepper paste prepared with the rice koji and bean koji using the regular *Aspergillus oryzae* strain. Such flavonoids in the form of aglycone seem to have a lot to do with the anti-obesity effect, according to a report that when administered with bean-derived isoflavones, i.e., genistein and daidzein, a test rat fast in gaining body weight and kept on a high-fat diet experienced a weight loss and a body fat loss and had a reduction in the size of adipocytes (fat cells) to that of normal cells.

It is shown in FIGS. 1 and 2.

Example 5: Sensory Evaluation on Hot Pepper Paste (Gochujang)

Twenty panels participated in a sensory evaluation on the rice hot pepper paste (Example 4) prepared with the rice koji using the *Aspergillus oryzae* CJ 1354 strain and the bean koji using the *Bacillus amyloliquefaciens* CJ 14-6 strain and the rice hot pepper paste (Comparative Example 4, control) prepared with the rice koji and bean koji using the regular *Aspergillus oryzae* strain.

For the sensory evaluation, a survey was carried out to investigate the acceptability concerning the detailed taste attributes and to evaluate the tastes of the rice hot pepper pastes in terms of the acceptability scored on a five-point scale. The results of the sensory evaluation are presented in the following Tables 15 and 16.

TABLE 15

Sensory Evaluation on Rice Hot Pepper Paste (Acceptability, Five-Point Scale)

|  | Rice hot pepper paste of Example 4 | Rice hot pepper paste of Comparative Example 4 |
| --- | --- | --- |
| Visual expression | 4.06 | 4.03 |
| Flavor | 3.74 | 3.57 |
| Texture (physical and tactile feel in the mouth) | 3.81 | 3.69 |
| Aftertaste | 3.56 | 3.36 |
| Hot taste | 3.74 | 3.79 |
| Saltiness | 3.44 | 3.42 |
| Sweetness | 3.56 | 3.51 |
| Umami | 3.71 | 3.52 |
| Heaviness | 3.82 | 3.85 |

TABLE 16

Acceptability of Rice Hot Pepper Paste

| | Acceptability (%) |
|---|---|
| Rice hot pepper paste of Example 4 | 56.1 |
| Rice hot pepper paste of Comparative Example 4 | 42.4 |
| No difference | 1.5 |

Example 6: Animal Experiment on Anti-Obesity Effect of Rice Hot Pepper Paste An animal experiment was conducted in order to evaluate the anti-obesity effect of the rice hot pepper paste (test group) prepared with the rice koji using the *Aspergillus oryzae* CJ 1354 strain and the bean koji using the *Bacillus amyloliquefaciens* CJ 14-6 strain according to Example 4.

The animals used in the experiment were male white rats (S.D. rat, 5 weeks old), purchased from Damool Science (South Korea) and kept in vivariums maintained at 18±2° C. under illumination controlled on a cycle of 12 hours (from 08:00 to 20:00).

Rat objects were divided into three groups, each group consisting of eight objects. In the control group, the rat objects were on a high fat diet consisting 20% of lard added to the powdery feed for white rat. In the Comparative Example-4 group, the rat objects were fed with 10% of a regular rice hot pepper paste powder on the same high fat diet of the control group. In the Example-4 group, 10% of a rice hot pepper paste powder using the novel strain of the present disclosure was added to the same high fat diet of the control group. The weight, adipose-tissue weight, and lipid contents of the rat objects are presented in the following Tables 17 to 21.

The weight and the diet intake were measured every week, and the adipose-tissue weight and the lipid contents were determined after a 12-hour fasting prior to the termination of the testing. The collected blood was centrifugally separated at 1,900×G for 20 minutes to isolate the blood serum, which was used as a sample for determination of the lipid content in blood serum. In order to analyze the total lipid content, the neutral fat content, and the total cholesterol content of liver and adipose tissues, chloroform-methanol (2:1, v/v) was added to 0.1 g of the collected liver or adipose tissue, which was then kept refrigerated for 3 days and soaked in distilled water. The liver and adipose tissues were centrifugally separated at 1,150×G for 20 minutes and measured in regards to the total lipid content in the lipid layer, that is, the bottom layer. The lipid tissue was diluted and used to determine the total cholesterol content and the neutral fat content.

TABLE 17

| Groups | Initial body weight (g) | Final body weight (g) | Body weight increment (g/day) | Daily diet intake (g/day) |
|---|---|---|---|---|
| Control | 197.13 | 603.13 | 7.25 ± 0.14 | 16.61 ± 0.65 |
| Comparative Example-4 group | 197.44 | 565.75*** | 6.58 ± 0.23*** | 16.45 ± 0.56 |
| Example-4 group | 197.25 | 569.19*** | 6.64 ± 0.28*** | 16.74 ± 0.59 |

TABLE 18

Adipose tissue weight (g/100 g body wt.)

| Groups | Fat in epididymis | Fat around kidney | Total white fat |
|---|---|---|---|
| Control | 2.83 ± 0.27 | 0.88 ± 0.11 | 7.31 ± 0.48 |
| Comparative Example-4 group | 2.36 ± 0.16** | 0.75 ± 0.09* | 6.64 ± 0.20** |
| Example-4 group | 2.35 ± 0.11** | 0.72 ± 0.09** | 6.62 ± 0.40** |

TABLE 19

Lipid content in blood serum (mg/dl)

| Groups | Neutral fat | Total cholesterol | LDL-cholesterol |
|---|---|---|---|
| Control | 97.25 ± 8.58 | 141.13 ± 16.81 | 120.20 ± 21.54 |
| Comparative Example-4 group | 83.50 ± 11.36* | 120.00 ± 17.66* | 85.20 ± 12.61** |
| Example-4 group | 79.13 ± 13.21* | 112.75 ± 16.88** | 79.20 ± 16.70*** |

TABLE 20

Lipid content in liver tissue (mg/g)

| Groups | Total fat | Neutral fat |
|---|---|---|
| Control | 217.96 ± 30.77 | 36.12 ± 7.81 |
| Comparative Example-4 group | 181.31 ± 18.53* | 29.52 ± 8.83 |
| Example-4 group | 173.52 ± 21.65** | 26.88 ± 5.23* |

TABLE 21

Lipid content in adipose tissue (mg/g)

| Groups | Neutral fat in epididymis adipose tissue | Neutral fat in mesenteric adipose tissue |
|---|---|---|
| Control | 249.75 ± 45.86 | 77.84 ± 9.45 |
| Comparative Example-4 group | 210.37 ± 47.31 | 61.30 ± 7.49** |
| Example-4 group | 197.80 ± 45.49* | 56.92 ± 6.64*** |

Statistic calibration: student-T test
*$P < 0.05$
**$P < 0.01$
***$P < 0.001$

As can be seen from the results of Table 17, the Example-4 group had a body weight increment accounting for no more than 91.6% of the body weight increment of the control group. According to the results of Table 18, the Example-4 group was lower in the weight of the adipose tissue around the kidney than the control group; that is, the weight of the adipose tissue around the kidney in the Example-2 group accounted for no more than 81.8% of that in the control group.

In Tables 19, 20 and 21, the lipid contents in the blood serum and liver and adipose tissues were significantly reduced in the Example-4 group relative to the control group.

Accordingly, the results of the Example 4 show that the rice hot pepper paste produced by the preparation method of the present disclosure was more effective in the weight loss than the rice hot pepper paste of the control group and lead to a more significant reduction of the lipid content in the tissues, that is, the bio-marker related to the anti-obesity, than the rice hot pepper paste of the Comparative Example-4 group.

[Accession Number]

Depository Institution: Korean Culture Center of Microorganisms (Abroad)

Accession No.: KCCM11300P

Date of Deposit: Sep. 27, 2012

Depository Institution: Korean Culture Center of Microorganisms (Abroad)

Accession No.: KCCM11718P

Date of Deposit: Jul. 1, 2015

What is claimed is:

1. A method for preparing a rice hot pepper paste, comprising:

soaking rice in water or adding water to rice and steaming the rice;

inoculating an *Aspergillus oryzae* CJ 1354 strain, deposited in the Korean Culture Center of Microorganisms under Accession number KCCM 11300P, into the steamed rice and conducting incubation to prepare a rice koji;

soaking soybeans in water or adding water to soybeans and steaming the soybeans;

inoculating a *Bacillus amyloliquefaciens* CJ 14-6 strain, deposited in the Korean Culture Center of Microorganisms under Accession number KCCM 11718P, into the steamed soybeans and conducting incubation to make a soybean koji;

combining the rice koji and the soybean koji;

adding brine and then at least one selected from the group consisting of steamed rice, soybean-processed food stuff, meju, and doenjang to the combined rice koji and soybean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging.

2. The method as claimed in claim 1, wherein in the step of preparing a rice koji, the steamed rice is inoculated with 0.1 to 0.3 wt. % of the *Aspergillus oryzae* CJ 1354 strain with respect to the total weight of the raw material.

3. The method as claimed in claim 2, wherein the step of preparing a rice koji further comprises conducting fermentation at 33 to 40° C. for 3 days after adding 0.5 to 1.5 wt. % of a volume expander with the CJ 1354 strain.

4. The method as claimed in claim 1, wherein in the step of preparing a soybean koji, the steamed soybeans are inoculated with 0.1 to 3.0 wt. % of the *Bacillus amyloliquefaciens* CJ 14-6 strain with respect to the total weight of the raw material.

5. The method as claimed in claim 4, wherein the step of preparing a soybean koji further comprises conducting fermentation at 30 to 45° C. for 3 days after inoculating the CJ-14-6 strain.

6. A rice hot pepper paste prepared by the method of claim 1 wherein the method comprises: soaking rice in water or adding water to rice and steaming the rice; inoculating an *Aspergillus oryzae* CJ 1354 strain, deposited in the Korean Culture Center of Microorganisms under Accession number KCCM 11300P, into the steamed rice and conducting incubation to prepare a rice koji; soaking soybeans in water or adding water to soybeans and steaming the soybeans; inoculating a *Bacillus amyloliquefaciens* CJ 14-6 strain, deposited in the Korean Culture Center of Microorganisms under Accession number KCCM 11718P, into the steamed soybeans and conducting incubation to make a soybean koji; combining the rice koji and the soybean koji; adding brine and then at least one selected from the group consisting of steamed rice, soybean-processed food stuff, meju, and doenjang to the combined rice koji and soybean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging; comprising a fermented product comprising a mixture of the rice koji inoculated with the *Aspergillus oryzae* CJ 1354 deposited in the Korean Culture Center of Microorganisms under Accession number KCCM 11300P, and the soybean koji inoculated with the *Bacillus amyloliquefaciens* CJ 14-6 deposited in the Korean Culture Center of Microorganisms under Accession number KCCM 11718P, strain.

7. An anti-obesity rice hot pepper paste prepared by the method of claim 1 wherein the method comprises: soaking rice in water or adding water to rice and steaming the rice; inoculating an *Aspergillus oryzae* CJ 1354 strain, deposited in the Korean Culture Center of Microorganisms under Accession number KCCM 11300P, into the steamed rice and conducting incubation to prepare a rice koji; soaking soybeans in water or adding water to soybeans and steaming the soybeans; inoculating a *Bacillus amyloliquefaciens* CJ 14-6 strain, deposited in the Korean Culture Center of Microorganisms under Accession number KCCM 11718P, into the steamed soybeans and conducting incubation to make a soybean koji; combining the rice koji and the soybean koji; adding brine and then at least one selected from the group consisting of steamed rice, soybean-processed food stuff, meju, and doenjang to the combined rice koji and soybean koji to prepare a first mixture, and conducting a first aging; and adding red chili powder and then at least one selected from the group consisting of starch sugar, soy sauce, salt, a spice-processed food stuff, a taste and flavor enhancer, and a grain-processed food stuff to the first mixture to prepare a second mixture, and conducting sterilization and a second aging; comprising a fermented product comprising a mixture of the rice koji inoculated with the *Aspergillus oryzae* CJ 1354 deposited in the Korean Culture Center of Microorganisms under Accession number KCCM 11300P, and the soybean koji inoculated with the *Bacillus amyloliquefaciens* CJ 14-6 deposited in the Korean Culture Center of Microorganisms under Accession number KCCM 11718P, strain.

* * * * *

SEQUENCE LISTING

```
<160> NUMBER OF SEQ ID NOS: 2

<210> SEQ ID NO 1
<211> LENGTH: 369
<212> TYPE: DNA
<213> ORGANISM: Aspergillus oryzae

<400> SEQUENCE: 1
actctgtctg atctagtgaa gtctgagttg attgtatcgc aatcagttaa aactttcaac    60
aatggatctc ttggttccgg catcgatgaa gaacgcagcg aaatgcgata actagtgtga   120
attgcagaat tccgtgaatc atcgagtctt tgaacgcaca ttgcgccccc tggtattccg   180
gggggcatgc ctgtccgagc gtcattgctg cccatcaagc acggcttgtg tgttgggtcg   240
tcgtcccctc tccgggggg acgggcccca aaggcagcgg cggcaccgcg tccgatcctc   300
gagcgtatgg ggctttgtca cccgctctgt aggcccggcc ggcgcttgcc gaacgcaaat   360
caatctttt                                                          369

<210> SEQ ID NO 2
<211> LENGTH: 1418
<212> TYPE: DNA
<213> ORGANISM: Bacillus amyloliquefaciens

<400> SEQUENCE: 2
agtcgagcgg acagatggga gcttgctccc tgatgttagc ggcggacggg tgagtaacac    60
gtgggtaacc tgcctgtaag actgggataa ctccgggaaa ccggggctaa taccggatgg   120
ttgtttgaac cgcatggttc agacataaaa ggtggcttcg gctaccactt acagatggac   180
ccgcggcgca ttagctagtt ggtgaggtaa cggctcacca aggcgacgat gcgtagccga   240
cctgagaggg tgatcggcca cactgggact gagacacggc ccagactcct acgggaggca   300
gcagtaggga atcttccgca atggacgaaa gtctgacgga gcaacgccgc gtgagtgatg   360
aaggttttcg gatcgtaaag ctctgttgtt agggaagaac aagtgccgtt caaatagggc   420
ggcaccttga cggtacctaa ccagaaagcc acggctaact acgtgccagc agccgcggta   480
atacgtaggt ggcaagcgtt gtccggaatt attgggcgta aagggctcgc aggcggtttc   540
ttaagtctga tgtgaaagcc cccggctcaa ccggggaggg tcattggaaa ctggggaact   600
tgagtgcaga agaggagagt gggagtacca cgtgtagcgg tgacatgcgt agagatgtgg   660
aggaacacca gtggcgaagg cgactctctg gtctgtaact gacgctgagg agcgacagcg   720
tggggagcga acaggattag ataccctggt agtccacgcc gtaaacgatg agtgataagt   780
gttagggggt ttccgccctt tagtgctgca gctaacgcat taagcactcc gcctggggag   840
tacggtcgca agagtgaaac tcaaaggaat tgacgggggc ccgcacaagc ggtggagcat   900
gtggtttaat tagaagcaac gcgaagaacc ttaccaggtc ttgacatcct ctgacaatcc   960
```

-continued

```
tagagatagg acgtcccctt cggggggcaga gtgacaggtg gagcatggtt gtcgtcagct   1020
cgtgtcgtga gatgttgggt taagtcccgc aacgagcgca acccttgatt ttagttgcca    1080
gcattcagtt gggcactcta aggtgactgc cggtgacaaa ccggaggaag gtggggatga    1140
cgtcaaatca tcatgcccct tatgacctgg gttacacacg tgttacaatg gacagaacaa    1200
agggcagcga aaccgcgagg ttaagccaat cccacaaatc tgttttcagt tcggatcgca    1260
gtctgcaact cgactgcgtg aagctggaat cgctagtaat cgcggatcag catgccgcgg    1320
tgaatacgtt cccgggcctt gtacacaccg cccgtctctc cacgagagtt tgtaacaccc    1380
gaagtcggtg aggtaaccct ttaggagcca gccgccga                            1418
```